US 7,177,302 B2

United States Patent
Stademann

(10) Patent No.: US 7,177,302 B2
(45) Date of Patent: Feb. 13, 2007

(54) SYSTEM AND METHOD FOR TRANSFERRING CONNECTING CONFIGURATIONS FROM A TELEPHONE NETWORK TO A DATA NETWORK

(75) Inventor: Rainer Stademann, Egmating (DE)

(73) Assignee: Siemens Aktiengesellschaft, Munich (DE)

( * ) Notice: Subject to any disclaimer, the term of this patent is extended or adjusted under 35 U.S.C. 154(b) by 1082 days.

(21) Appl. No.: 10/137,650

(22) Filed: May 3, 2002

(65) Prior Publication Data

US 2002/0172194 A1   Nov. 21, 2002

(30) Foreign Application Priority Data

May 4, 2001  (EP) .................................. 01110857

(51) Int. Cl.
*H04L 12/66* (2006.01)
(52) U.S. Cl. ...................................... 370/352; 370/401
(58) Field of Classification Search ................ 370/352, 370/353, 354, 355–356, 389, 392, 401
See application file for complete search history.

(56) References Cited

U.S. PATENT DOCUMENTS 5,764,736 A * 6/1998 Shachar et al. .......... 379/93.09
6,067,546 A * 5/2000 Lund ........................... 370/352
6,163,536 A * 12/2000 Dunn et al. ................. 370/352
6,377,570 B1 * 4/2002 Vaziri et al. ................ 370/352
6,493,447 B1 * 12/2002 Goss et al. .................. 370/352
6,704,303 B1 * 3/2004 Bowman-Amuah ......... 370/352

FOREIGN PATENT DOCUMENTS

EP       0 959 593 A2    11/1999
WO     WO 00/35176      6/2000

* cited by examiner

*Primary Examiner*—Chau Nguyen
*Assistant Examiner*—Jordan Hamann
(74) *Attorney, Agent, or Firm*—Morrison & Foerster LLP

(57) ABSTRACT

Two subscribers A and B are each connected to a network, e.g. by means of a leased line or a dialup connection. Subscriber A sets up a telephone connection to subscriber B. In the course of the telephone connection, a data connection additionally needs to be set up. A service provided by the telephone network operator and an appropriate method taking place on the subscribers data terminal equipment automatically transfer the data network addresses of the subscribers involved in a connection and also the connection configuration of the telephone connection to the subscribers data terminal equipment. This means that a data network connection can automatically be set up for a telephone connection on request.

7 Claims, 1 Drawing Sheet

SYSTEM AND METHOD FOR TRANSFERRING CONNECTING CONFIGURATIONS FROM A TELEPHONE NETWORK TO A DATA NETWORK

CLAIM FOR PRIORITY

This application claims priority to European Application No. 01110857.8 which was filed in the German language on May 4, 2001.

TECHNICAL FIELD OF THE INVENTION

The present invention relates to a system and method for transferring connection configurations from a telephone network to a data connection.

BACKGROUND OF THE INVENTION

In a network having two subscribers A and B, each connected to a data network, e.g. the Internet, e.g. by means of a leased line or a dialup connection. Subscriber A sets up a telephone connection to subscriber B. In the course of the telephone connection, in addition to the voice information, data, e.g. multimedia data, also need to be transferred between subscriber A and subscriber B.

In this type of network, it is difficult to find a suitable method which allows not only the telephone connection between two or more subscribers, but also a data network connection to be set up automatically between these subscribers upon request, whose configuration is automatically aligned with changes in the configuration of the telephone connection.

One known method involves all the subscribers knowing their data network addresses (e.g. IP addresses), exchanging them orally over the telephone connection and configuring their data terminal equipment accordingly. This is laborious for the subscribers, however, and presupposes knowledge about the way in which the data network works. It is not possible to set up a data network connection to an existing telephone connection automatically. Similarly, all the configuration changes have to be made manually.

Another known method uses the option of the subscribers registering with a central server in the data network, where an (imaginary) name for the subscribers is linked to their data network address. A data network connection can then be set up using the subscribers' (imaginary) names. This method is also unable to set up a data network connection automatically in addition to an existing telephone connection or to align the configuration of the data network connection with an altered configuration of the telephone connection.

In another known method, the subscribers' telephone equipment and data terminal equipment are connected to one another and, when the data network connection is set up, the data terminal equipment transfers the connected telephone equipment's telephone number together with the data terminal equipment's data network address to a central database. If a data network connection is required in addition to the telephone connection, the telephone equipment first transmits the other subscriber's call number to the data terminal equipment. The data terminal equipment can take the necessary data network address from the central database. A drawback in this context is the connection which is required between the telephone equipment and the data terminal equipment, and furthermore, this method often cannot automatically align the data connection (e.g. when no ISDN connections are involved) upon call forwarding, call transfer, conferencing and other changes in the configuration of the telephone connection.

SUMMARY OF THE INVENTION

In one embodiment of the invention, there is a method for transferring connection configurations from a telephone network to a data network having an existing telephone connection between at least two subscribers. The method includes, for example, storing a data network address for data terminal equipment of each subscriber in one or more central servers with a corresponding telephone number of the at least two subscribers, and notifying the data terminal equipment of a first of the at least two subscribers of the data network address of the data terminal equipment of a second of the at least two subscribers and of configuration of the connection in the telephone network by the server, when a telephone connection exists between the at least two subscribers, wherein when the configuration of the telephone connection changes, a new configuration is automatically transferred to the data terminal equipment.

In another aspect of the invention, the data network is the Internet, and the data network addresses of the data terminal equipment are IP addresses.

In another aspect of the invention, a service feature is controlled by a switching center in the telephone network.

In another aspect of the invention, the method includes a service feature which is controlled by a server in the data network.

In another aspect of the invention, when a plurality of central servers are used, the at least two subscribers are associated with the individual servers according to a prescribed scheme based on the subscribers call numbers in the telephone network, and the server associated with the subscriber requesting the data network connection undertakes control of the data network connection.

In another embodiment of the invention, there is a server device in a data network having a database which stores a telephone number for subscribers in association with a data network address, wherein the server device receives the data network address and telephone number from the data terminal equipment of the subscribers, the server device receives a configuration of a telephone connection from a switching center in the telephone network, the server device notifies the data terminal equipment of a first subscriber of the data network address of the data terminal equipment of a second subscriber and of the configuration of the connection in the telephone network when a telephone connection exists between the subscribers, and when the configuration of the telephone connection changes, the server device automatically transfers the new configuration to the data terminal equipment.

In another embodiment of the invention, there is a method for transmitting a telephone number and a data network address of a subscriber to a data network server, which takes place in the data terminal equipment of a subscriber. The method includes, for example, prescribing the telephone number via the subscriber, determining the data network address, transmitting the telephone number and the data network address to the server as a data record, and setting up a data network connection at the request of a subscriber using the data network addresses, received from the server, of the subscribers involved in a telephone connection and using the associated connection configuration.

In another aspect of the invention, the data network is the Internet, and the data network addresses of the data terminal equipment are IP addresses.

In another aspect of the invention, the method includes a service feature which is controlled by a server in the data network.

In another aspect of the invention, when a plurality of central servers are used, the at least two subscribers are associated with the individual servers according to a prescribed scheme based on the subscribers call numbers in the telephone network, and the server associated with the subscriber requesting the data network connection undertakes control of the data network connection.

In another embodiment of the invention, there is a system for transferring connection configurations from a telephone network to a data network. The system includes, for example, at least two subscribers communicating via an existing telephone connection having a data network connection, and data terminal equipment of each subscriber having a data network address which is automatically stored by one or more central servers together with a telephone number of the respective subscriber, wherein the data terminal equipment of one of the subscribers is automatically notified of the data network address of the data terminal equipment of the other subscriber and of the configuration of the connection in the telephone network by the server when there is a telephone connection between the subscribers, and in the event of changes in the configuration of the telephone connection, the new configuration is automatically transferred to the data terminal equipment.

BRIEF DESCRIPTION OF THE DRAWINGS

The invention is explained in more detail below with reference to the drawing.

DETAILED DESCRIPTION OF THE PREFERRED EMBODIMENTS

Figure 1:
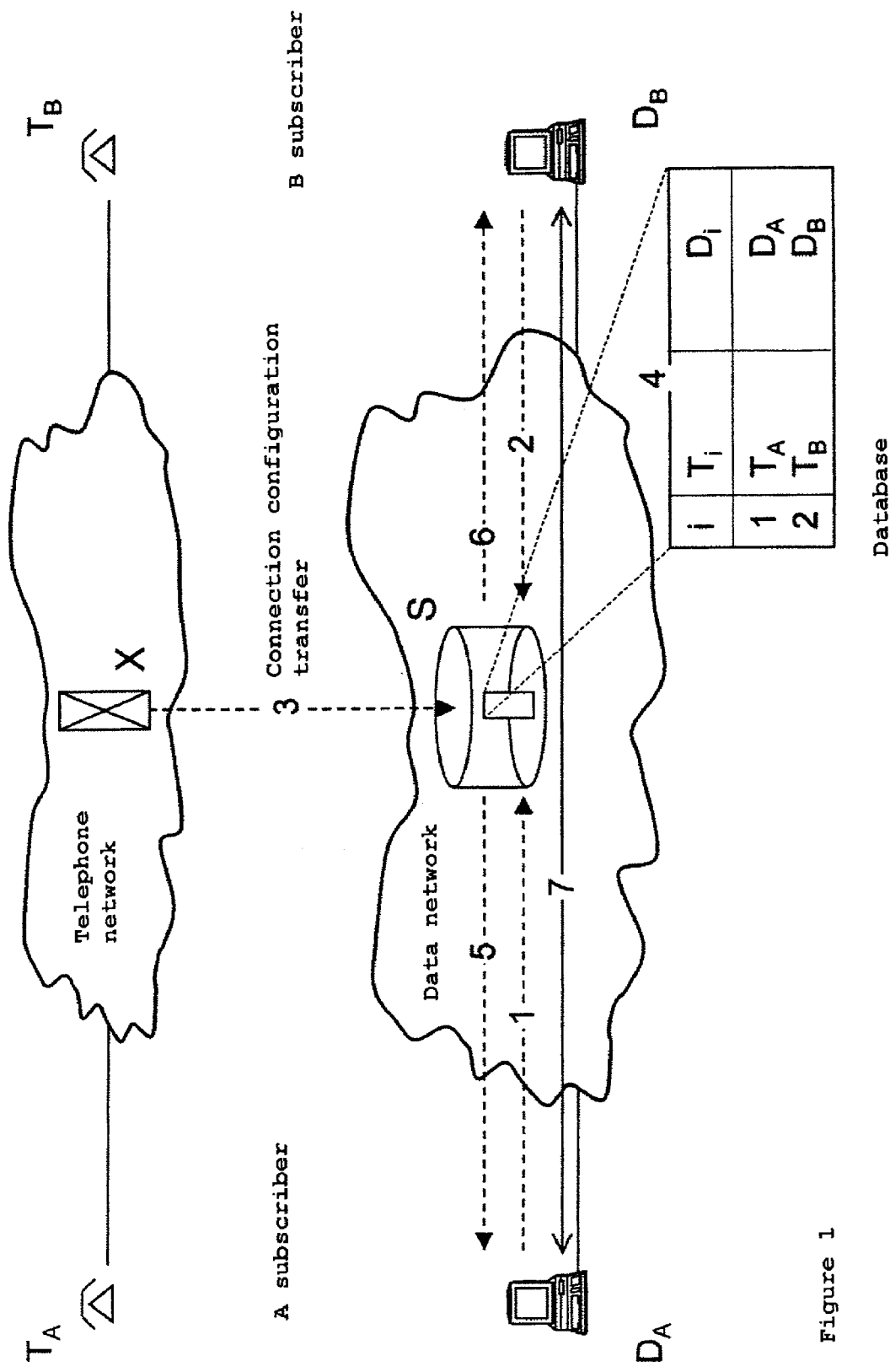
FIG. 1 shows two subscribers A and B connected both to a telephone network and to a data network.

The present invention improves the efficiency and the user-friendliness of the previously known methods for transferring connection configurations from the telephone network to a data network.

In one embodiment of the invention, a service provided by the telephone network operator and an appropriate method taking place on the subscribers' data terminal equipment automatically transfer the data network addresses of the subscribers involved in a connection and also the connection configuration of the telephone connection to the subscribers' data terminal equipment. A data network connection can therefore automatically be set up on subscriber request in line with the telephone connection, without the subscriber needing to know any of the data network addresses involved. This requires no connection between the data terminal equipment and the telephone equipment. The data network connection can be automatically aligned upon call forwarding, call transfer, conferencing and other changes in the configuration of the telephone connection.

FIG. 1 shows two subscribers A and B connected both to a telephone network and to a data network. The telephone network operator activates the service for a first subscriber A with telephone number $T_A$ and a second subscriber B with telephone number $T_B$ in a switching center X and provides the two subscribers A, B with software for use on their computers. Once the computers' connection to the network (e.g. Internet) has been set up, the software transfers the current IP addresses $D_A$, $D_B$ together with the telephone numbers $T_A$, $T_B$ to the server S—this operation is denoted by 1 and 2 in the figure. The server S produces a database which includes the association between telephone number and IP address.

When subscriber A sets up a connection to subscriber B, the switching center X in the telephone network transfers the connection data for the telephone connection to the server S—this operation is denoted by 3 in FIG. 1. The server S uses the database to determine the IP addresses $D_A$, $D_B$ associated with this telephone connection—operation 4 in the figure—and transfers them together with the connection configuration to the software on the computers of the subscribers A, B involved in the connection—operations 5 and 6. At the request of one of the two subscribers A, B, the software on the computers can set up a direct connection between the computers at any time, for example by virtue of one of the subscribers A, B activating a corresponding function on this telephone equipment or on his data terminal—operation 7.

What is claimed is:

1. A method for transferring connection configurations from a telephone network to a data network having an existing telephone connection between at least two subscribers, comprising:
    storing a data network address for data terminal equipment of each subscriber in one or more central servers with a corresponding telephone number of the at least two subscribers; and
    notifying the data terminal equipment of a first of the at least two subscribers of the data network address of the data terminal equipment of a second of the at least two subscribers and of configuration of the connection in the telephone network by the server, when a telephone connection exists between the at least two subscribers, wherein
    when the configuration of the telephone connection changes, a new configuration is automatically transferred to the data terminal equipment.

2. The method as claimed in claim 1, wherein the data network is the Internet, and the data network addresses of the data terminal equipment are IP addresses.

3. The method as claimed in claim 1, wherein control of transferring connection configurations is controlled by a switching center in the telephone network.

4. The method as claimed in claim 1, wherein control of transferring connection configurations is controlled by a server in the data network.

5. The method as claimed in claim 1, wherein a plurality of central servers are used,
    the at least two subscribers are associated with the individual servers based on the subscribers call numbers in the telephone network, and
    the server associated with the subscriber requesting the data network connection undertakes control of the data network connection.

6. A server device in a data network comprising a database which stores a telephone number for subscribers in association with a data network address, wherein
    the server device receives the data network address and telephone number from the data terminal equipment of the subscribers, the server device receives a configuration of a telephone connection from a switching center in the telephone network, the server device notifies the data terminal equipment of a first subscriber of the data network address of data terminal equipment of a second subscriber and of the configuration of the connection in the telephone network when the telephone connection exists between the subscribers, and when the configuration of the telephone connection changes, the server device automatically transfers the new configuration to the data terminal equipment.

7. A system for transferring connection configurations from a telephone network to a data network, comprising:

at least two subscribers communicating via an existing telephone connection having a data network connection; and data terminal equipment of each subscriber having a data network address which is automatically stored by one or more central servers together with a telephone number of the respective subscriber, wherein the data terminal equipment of one of the subscribers is automatically notified of the data network address of the data terminal equipment of the other subscriber and of the configuration of the connection in the telephone network by the server when there is a telephone connection between the subscribers, and in the event of changes in the configuration of the telephone connection, the new configuration is automatically transferred to the data terminal equipment.

* * * * *